United States Patent
Klein

[15] 3,668,703
[45] June 6, 1972

[54] MOTION DETECTOR
[72] Inventor: Carl F. Klein, Milwaukee, Wis.
[73] Assignee: Johnson Service Company, Milwaukee, Wis.
[22] Filed: Jan. 31, 1969
[21] Appl. No.: 796,945

[52] U.S. Cl............................343/5 PD, 340/258 A
[51] Int. Cl. ......................G01s 9/02, G08b 13/22
[58] Field of Search..............343/5 PD, 8; 340/258 R, 258 A, 340/258 B

[56] References Cited

UNITED STATES PATENTS

| | | | |
|---|---|---|---|
| 2,965,893 | 12/1960 | Barker | 340/258 UX |
| 3,407,403 | 10/1968 | Charldt | 343/5 PD X |
| 3,422,415 | 1/1969 | Ichimori | 340/258 |
| 3,383,682 | 5/1968 | Stephens, Jr. | 343/8 |

Primary Examiner—T. H. Tubbesing
Attorney—Andrus, Sceales, Starke & Sawall

[57] ABSTRACT

This disclosure relates to an intrusion detector having a microwave transmitter and receiver employing a single antenna. A transistor is interconnected through the inductive cavity of a coaxial line to define a Colpitts' oscillator for transmitting of energy of a given frequency into the area to be protected. The transistor is exposed to both the transmitted and the echo signal in the cavity. The non-linear characteristic of the transistor mixes the transmitted and the received signals and includes an output across an emitter resistor which is equal to the difference of the transmitter frequency and the echo frequency i.e., the Doppler frequency. The latter signal is amplified and actuates a Schmitt trigger circuit for controlling an alarm.

11 Claims, 3 Drawing Figures

PATENTED JUN 6 1972      3,668,703
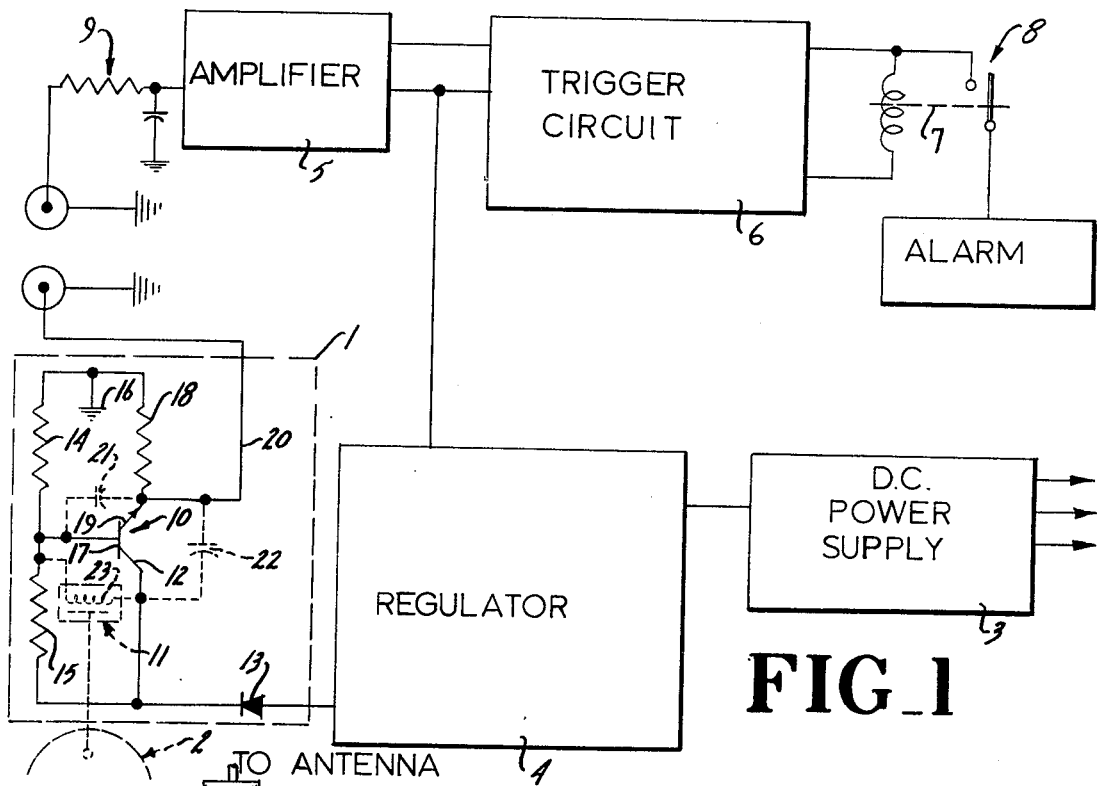
FIG_1
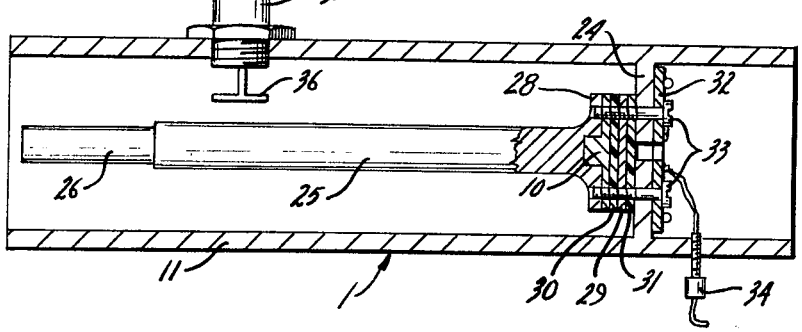
FIG_2
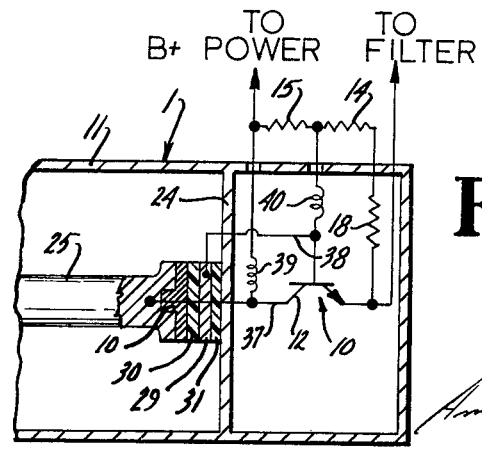
FIG_3
INVENTOR.
CARL F. KLEIN
BY
Andrus, Sceales, Starke & Sawall
Attorneys

MOTION DETECTOR

This invention relates to a motion detector employing a solid state oscillator-mixer unit and particularly to a space protective device responsive to a Doppler frequency effect.

Various intrusion detection systems are based on the concept of radiating energy such as ultrasonic or electromagnetic energy into the area to be detected and detecting the presence of an intruder by noting any change in the energy resulting therefrom. A highly satisfactory system based on the Doppler frequency effect had been developed. For example, U.S. Pat. No. 3,242,486 which is assigned to Johnson Service Co. discloses a triggered intrusion detection system employing the Doppler effect. Energy of a given frequency is radiated into the protected area and the reflected signals are received by a suitable receiver, along with a portion of the transmitter energy. Any movement of a body within the area results in a Doppler frequency output from the receiver unit. The Doppler frequency is detected and utilized to energize or trigger an alarm and thereby indicate the presence of an intruder.

The basic operation of a low-powered Doppler detector is based on the comparison of the transmitted and an echo signal. In the absence of an intruder or other target motion the transmitted and echo signals will have the same frequency. Any motion, however, results in a shifting in the frequency in the reflected or echo signal and not of the transmitted or original. The shift will be dependent upon the radial velocity of the intruder.

The present invention is particularly directed to a relatively inexpensive detection system based on the Doppler effect. Generally in accordance with the present invention, a solid state element is employed as a common oscillator and mixer element forming a part of a microwave transmitter and receiver interconnected to employ a single antenna. Generally, the solid state element may be a transistor or the like which is interconnected through an inductive cavity to define an oscillator for transmitting of energy of a given frequency into an area to be protected. The transistor is exposed to both the transmitted and the echo signal in the cavity. The transistor being a non-linear device performs the mixing of the transmitted and the received signals and provides an output which is equal to the sum and different frequencies of the transmitted and received signals as well as the higher order harmonic terms of such signals. In a Doppler system the difference in frequency is generally detected and consequently all other frequency signals are eliminated, for example, by the use of a low pass filter network which interconnects only the different frequencies to a suitable detection system.

In a particularly novel circuitry, the transistor is interconnected to define a Colpitts' oscillator circuit and the transistor is mounted within an inductive cavity and capacitive coupled thereto in such a manner that the cavity constitutes the inductive characteristic of the Colpitts' oscillator. An emitter resistor provides an output which is interconnected through any suitable voltage amplification means having the necessary electrical and thermal stability. The inductive cavity may be a coaxial line having a central conductor secured to an end mounting wall with the transistor and D.C. isolating capacitors interconnected therebetween the emitter resistor, suitable bias resistors, bypass elements, and the like may be mounted on a suitable circuit board and located to the back side of the end mounting walls to provide a compact and reliable system.

The drawing furnished herewith illustrates the best mode presently contemplated by the inventor for carrying out the present invention and clearly discloses the above advantages and features as well as others which will be readily understood from the following description.

In the drawing:

FIG. 1 is a schematic circuit diagram of an intrusion detection system constructed in accordance with the present invention;

FIG. 2 is an illustration of an inductive cavity incorporating a dual oscillator-mixer unit constructed in accordance with the present invention; and FIG. 3 is a diagramatic illustration of the circuit and cavity construction shown in FIGS. 1 and 2.

Referring to the drawing and particularly to FIG. 1, an intrusion alarm system is illustrated including a microwave source unit 1 specially constructed in accordance with the present invention to establish a radio frequency transmitter and receiver. A common transmitting and receiving antenna 2 is coupled to the source unit 1 and adapted to establish a radiation field in accordance with the size and shape of the area to be detected. A D.C. power supply 3 is interconnected to energize the source unit 1 through a suitable regulator 4. The output circuit of the system includes an amplifier 5 connected to the microwave source unit 1 and interconnected to actuate a trigger circuit 6 such as a Schmitt trigger circuit. An output relay 7 is connected to the output of circuit 6 and includes contacts 8 interconnected to a suitable alarm such as a bell, lamp, or the like.

The power supply 3, regulator 4, amplifier 5 and trigger circuit 6 are shown in block diagram as they may be of any suitable construction. For example, the amplifier may be a suitable stabilized, integrated circuit providing multiple stage low level D. C. to audio frequency high gain amplification to suitably increase the voltage of the received signal.

The microwave source unit 1, as hereinafter more fully described, is specially constructed to provide a dual function of an oscillator and mixer. Generally, the unit 1 establishes a radiated field of a given frequency and further receives the echo signal or signals. Both the transmitted signal and the echo signals are applied to establish an output which includes the difference in frequency between the transmitted and received signals. The difference signal is a Doppler motion signal directly related to the motion of an intruder in the radiated field. The output of the microwave unit 1 is interconnected to amplifier 5 through a filter network 9 which is selected to pass the Doppler frequency while eliminating all of the higher order frequency components of the output signal. The Doppler signal is amplified and applied to the trigger circuit 6 for operating relay 7. This Doppler signal is therefore employed to detect such motion and intrusion.

More particularly in accordance with the present invention, the microwave unit 1 is constructed to operate in a radio frequency portion of the frequency spectrum and includes a transistor 10 interconnected to define an oscillator circuit with a microwave cavity 11 coupled to the transistor 10 to define or form an inductive element in the oscillator circuit. In the illustrated embodiment of the invention, the transistor 10 is interconnected to define a Colpitts' oscillator, as follows. The transistor 10 has the collector 12 interconnected by a suitable steering diode 13 and to the output of the regulator 4. A pair of bias resistors 14 and 15 are interconnected between the regulator 4 and ground 16 to define a voltage dividing network. The base 17 of transistor 10 is connected to the junction of the resistors 14 and 15. An emitter resistor 18 interconnects the emitter 19 to ground. An output signal line 20 interconnects the emitter 19 to the filter 9. The transistor 10 has inherent junction capacities with the base to emitter junction capacitance and an added capacitor as subsequently described and shown by capacitor 21. The collector to emitter junction capacitance and an added capacitor are similarly shown by the capacitor 22. An inductor 23 which is shown connected between the base 17 and collector 12 is defined or formed by the microwave cavity 11. This inductance is coupled to the antenna 2 as schematically shown through the cavity construction.

In the operation of the system, the energization of the oscillator transistor 10 establishes a radiated field, with a pattern determined by the antenna 2. The antenna 2 also receives any echo or reflected signal and injects such signal into the inductive cavity 11. It is combined with the transmitted signal and applied to the transistor 10. The non-linear characteristic of the transistor 10 provides the desired mixing function with the output appearing across the emitter resistor 18 of the transistor 10. The output signal as it appears at the emitter 19 includes the various frequency components including the transmitted frequency, the echo frequency as well as the sum and different frequencies between the transmitted and received signals. The difference frequency, which is known as the Doppler motion frequency, is employed in the present invention. The emitter 19 is interconnected directly to the low pass filter 9 to filter out essentially all but the Doppler motion frequency signal.

As shown in FIGS. 2 and 3 the microwave unit 1 and cavity 11 may be advantageously formed as a coaxial transmission line unit having the cavity 11 formed as a generally rectangular wave guide. A mounting wall 24 is provided, properly located adjacent one end of the cavity 11. A coaxial line 25 is secured to the mounting wall 24 and projects therefrom into the cavity 11. The outer end of line 25 in accordance with known constructions terminates at an adjustable stub 26 for adjustment of the transmitted frequency within selected limits.

In the preferred construction, the transistor 10 is disposed within a recess in the mounting end of the line 25 and is clamped in stacked relation between the mounting end of the line 25 which is flanged as at 28 and the wall 24. Additionally, the capacitive coupling elements are located between the wall 24 and the line 25. An intermediate conductor 29 is disposed between a pair of dielectric layer elements 30 and 31 with the conductors and elements clamped between the transistor 10 and the wall 24. A circuit board 32 for supporting the bias resistors of FIG. 1 and the like, is disposed to the back side of the wall 24. A plurality of mounting screws 33 pass through the circuit boards 32, wall 24 and the several capacitive and transistor elements and thread into the outer peripheral portion of the mounting flange 28 to physically clamp and support the components on the mounting wall 24. A suitable power and signal lead connector 34 is provided in the sidewall of cavity 11 for establishing the circuit connections of FIG. 1.

A suitable antenna connector 35 is also provided in the wall of the cavity 11 and includes a T-coupling probe 36. The antenna 2 may be of any suitable construction dependent upon the size and shape of the area to be protected and the operating frequencies. For example, a tee-fed slot, a dipole or a loop antenna may be satisfactorily applied for the P-, L-, and S-band frequencies.

A diagramatic illustration of the transistor oscillator circuit with the cavity capacitors defined by the dielectric layers 30 and 31 of FIGS. 2 and 3 is shown in FIG. 3. Corresponding elements in the structure of FIG. 3 are numbered in accordance with the illustration of FIGS. 1 and 2 for simplicity and clarity of explanation.

In FIG. 3, collector lead 37 interconnects the collector 12 of the transistor 10 to the line 25. A further lead 38 interconnects the base 17 of the transistor 10 to the intermediate conductor 29. The capacitors defined by the dielectric layers 30 and 31 establish direct current isolation between the transistor's collector and base elements and the base and emitter elements. However, from a small signal or AC equivalent circuit, the capacitor 31 appears as a short circuit between the grounded cavity wall and the base lead 38 thereby effectively places the base at ground potential. The capacitor 30 appears as a capacitive load to the coaxial transmission line cavity 11. The impedance however is generally of an order to simulate a shorted coaxial transmission line at least for purposes of analysis and design consideration where the length is less than or approximately equal to a quarter wavelength. As a result the cavity appears as an inductive load between the base 17 and collector 12.

For purposes of AC signal analysis, the circuit generally is as shown in FIG. 1 with the AC elements corresponding to the dotted line connected capacitors 20 and 21 and the dotted line inductor 23. This will be recognized as a basic Colpitts' oscillator. Although this circuit has been found to be highly effective, any other type of oscillator circuit operable at RF frequencies might be employed within the broadest scope of the present invention.

In the embodiment of the invention illustrated in FIG. 3, a radio frequency choke coil 39 is connected between the collector and the power supply and a similar radio frequency choke coil 40 is connected between the base and the junction to the voltage dividing resistors 14 and 15.

In the operation of the circuit, the circuit of transistor 10 is energized from the power supply 3 and establishes oscillation. The capacitors 21 and 22 are connected in series with each other and in parallel with the inductor 23. The voltage developed across the base to emitter capacitor 21 provides a feedback voltage to establish oscillator action. The oscillations establish a field within the cavity 11 which is transmitted through the antenna connector 35 to the antenna 2 which in turn establishes a radiated field within the area to be protected. In the absence of any intrusion and particularly motion within the radiated field, the transmitted signal and any reflected signal introduced through the antenna 2 into the cavity 11 will be of a corresponding frequency. Consequently the frequency applied to the oscillator remains constant. The output taken at the emitter 19 of the transistor 10 to ground remains essentially at the transmitted frequency. The filter network 9 prevents passage of such signal and triggering of the alarm.

In the presence of motion of an intruder in the protected area, however, the frequency of the reflected energy is shifted in accordance with the known Doppler frequency effect. A related signal is introduced into the cavity 11 through the antenna 2 and both the transmitted and the reflected frequency signals are applied to the transistor 10. The transistor 10 however functions as a mixer diode as a result of its non-linear junction characteristics. Therefore the simultaneous application of the several frequency results in the reproduction of the original or basic frequency as well as the sum and different frequencies in addition to a multitude of harmonic frequencies. In the present invention, the Doppler or difference frequency appears along with all of the other frequency signals at the emitter 19. The low pass filter 9 essentially eliminates all of the higher order frequency components and only passes the Doppler frequency component or signal. This signal is amplified and applied to the circuit 6, which as previously noted, may preferably be constructed as a Schmitt trigger to provide amplitude detection generally in accordance with the teaching of the Corbell U.S. Pat. No. 3,242,486.

The Schmitt trigger circuit will be responsive to the amplitude of the signal which in turn will be proportional to the size and distance of the target. The adjustment of the Schmitt trigger in accordance with the Corbell patent will thereby provide a means of discriminating target size and distance.

The present invention provides a relatively low cost and inexpensive system as a result of employing a single common transmitting and receiving antenna in combination with the transistor functioning as both the source of RF energy and the mixer to produce a detectable output signal.

I claim:

1. A motion detection apparatus, comprising means including an oscillator means having a solid state amplifying means, antenna means coupled to said oscillator means to transmit a protective field and to receive and mix a related reflected echo signal with the transmitted signal and impress both the transmitted and received signals upon said solid state amplifying means, said solid state amplifying means having a common transmitting and receiving solid state input element having a non-linear characteristic and operating without a negative resistance characteristic portion, said solid state input element simultaneously functioning as the active element of the oscillator and as a detector and mixer to directly mix said transmitted and received signals and establish an oscillator output signal related to the selected reflected signals, said amplifying means establishing amplification of the echo signal.

2. A motion detection apparatus, comprising means including an oscillator means having a solid state amplifying means, antenna means coupled to said oscillator means to transmit a protective field and to receive and mix a related reflected echo signal with the transmitted signal and impress both the transmitted and received signals upon said solid state amplifying means, said solid state amplifying means having a non-linear characteristic and simultaneously functioning as the active element of the oscillator and as a detector and mixer to directly mix said transmitted and received signals and establish an oscillator output signal related to the selected reflected signals, said oscillator means has a wave guide means and establishes an alternating current field, said antenna means being coupled to said alternating current field to transmit said field as the protective field and to introduce a reflected field corresponding to the echo signal with the alternating current field and thereby impress both the transmitted and echo fields upon said solid state amplifying means.

3. The motion detection apparatus of claim 1, wherein said oscillator means includes an inductive cavity coupled to the solid state input element and defining an inductive control means in the oscillator, and means coupling the antenna to the inductive cavity.

4. A motion detection apparatus, comprising means including an oscillator means having a solid state amplifying means, antenna means coupled to said oscillator means to transmit a protective field and to receive and mix a related reflected echo signal with the transmitted signal and impress both the transmitted and received signals upon said solid state amplifying means, said solid state amplifying means having a nonlinear characteristic and simultaneously functioning as the active element of the oscillator and as a detector and mixer to directly mix such transmitted and received signals and establish an oscillator output signal related to the selected reflected signals, said oscillator means includes a coaxial line defining an inductive cavity coupled to the solid state amplifying means to form an inductive control means in the oscillator means, and means coupling the antenna to the inductive cavity.

5. The motion detection apparatus of claim 1, wherein said input element is a transistor having a load resistor connected in series with a terminal means of the transistor, an inductive cavity means coupled to terminal means of the transistor to cooperate with the inherent capacitance of the transistor junctions to define said oscillator, and means to couple the antenna means to said inductive cavity means.

6. The motion detection apparatus of claim 1, wherein said input element includes a transistor connected in a common base configuration to a bias source, a load resistor connected in series with the emitter of the transistor, inductive cavity means coupled to the base and collector junction of the transistor to cooperate with the inherent capacitance of the transistor junctions and define said oscillator, and means to couple the antenna means to said inductive cavity.

7. Motion detection apparatus of claim 1, wherein said input element is a transistor having an output resistor connected to a terminal means of the transistor, a coaxial transmission line and a direct current isolating capacitive means connected to said coaxial transmission line and to said transistor to define an inductive cavity means connected to elements of the transistor and to thereby form the oscillator means, and means coupling the antenna to said cavity.

8. Motion detection apparatus of claim 1, wherein said input element includes a transistor connected in a common base configuration to a bias source with an emitter output resistor, a coaxial transmission line and capacitive means connected to said coaxial transmission line and to said transistor to define an inductive cavity means connected across the base to collector of the transistor, and means coupling the antenna to said cavity.

9. Motion detection apparatus of claim 1, wherein said input element includes a transistor having an output resistor, a coaxial transmission line having an outer cavity wall and a center conductor secured to an end wall of the cavity wall, a pair of capacitive means connected in series between said coaxial conductor and said end wall and to said transistor to define an inductive cavity means connected to the transistor, and cooperating with the junction capacitance to form the oscillator, and means coupling the antenna to the coaxial transmission line.

10. The motion detection apparatus of claim 9, wherein said transistor is connected in a common base configuration and said resistor is connected to the emitter of the transistor, said cavity wall being connected to a ground reference, said pair of capacitive means having a first capacitive means connected between the base and the cavity wall and selected to define a short circuit condition to the alternating current in the oscillator and a second capacitive means connected between the base and the collector of the transistor and selected to form with said cavity an inductive means between the base and the collector whereby said transistor oscillates to generate said transmitted field and both the transmitted field and the echo field are applied to the transistor and appear across said resistor as a Doppler frequency signal.

11. A motion detection apparatus comprising means including an oscillator means having a solid state amplifying means, antenna means coupled to said oscillator means to transmit a protective field and to receive and mix a related reflected echo signal with the transmitted signal and impress both the transmitted and received signals upon said solid state amplifying means, said solid state amplifying means having a nonlinear characteristic and simultaneously functioning as the active element of the oscillator and as a detector and mixer to directly mix said transmitted and received signals and establish an oscillator output signal related to the selected reflected signals, a second amplifying means connected to said first amplifying means to amplify said output signal, triggered alarm means connected to said second amplifying means, and a regulated power supply connected to energize said amplifying means and said alarm means.

* * * * *